United States Patent [19]
Kim

[11] Patent Number: 5,961,618
[45] Date of Patent: Oct. 5, 1999

[54] DUAL-BUS RISER CARD FOR AN EXPANSION SLOT

[75] Inventor: Bang-Kil Kim, Seoul, Rep. of Korea

[73] Assignee: SamSung Electronics Co., Ltd., Suwon, Rep. of Korea

[21] Appl. No.: 08/679,432

[22] Filed: Jul. 8, 1996

[30] Foreign Application Priority Data

Jul. 7, 1995 [KR] Rep. of Korea ................. 95-19941

[51] Int. Cl.⁶ .................................................. G06F 13/00
[52] U.S. Cl. ........................................ 710/101; 710/102
[58] Field of Search ................................. 395/281, 282; 361/686, 683

[56] References Cited

U.S. PATENT DOCUMENTS

| | | |
|---|---|---|
| 4,170,013 | 10/1979 | Black . |
| 5,163,833 | 11/1992 | Olsen et al. . |
| 5,174,762 | 12/1992 | Hoppal et al. . |
| 5,338,214 | 8/1994 | Steffes et al. ........................... 439/160 |
| 5,406,453 | 4/1995 | Cusato et al. . |
| 5,440,075 | 8/1995 | Kawakita et al. ....................... 174/265 |
| 5,454,081 | 9/1995 | Thome . |
| 5,454,084 | 9/1995 | Uchikoga . |
| 5,457,785 | 10/1995 | Kikinis et al. . |
| 5,495,389 | 2/1996 | Dewitt et al. ............................ 361/683 |
| 5,513,329 | 4/1996 | Pecone . |
| 5,517,623 | 5/1996 | Farrell et al. . |
| 5,519,573 | 5/1996 | Cobb et al. . |
| 5,541,586 | 7/1996 | Wise ................................... 340/825.79 |
| 5,594,621 | 1/1997 | van Rumpt ............................. 361/686 |
| 5,604,871 | 2/1997 | Pecone ................................... 395/281 |

*Primary Examiner*—Ayaz R. Sheikh
*Assistant Examiner*—David A. Wiley
*Attorney, Agent, or Firm*—Robert E. Bushnell, Esq.

[57] ABSTRACT

A dual-bus riser card for an expansion slot in a computer system is formed by a substrate having an edge portion removably mountable into the expansion slot substantially perpendicular to a motherboard of the computer system, a first plurality of bus slots formed on one side of said substrate and adapted for connection to corresponding expansion boards of either ISA or EISA bus architecture, a second plurality of bus slots formed on another and opposite side of said substrate for connection to corresponding expansion boards of PCI bus architecture. The edge portion of the dual-bus riser card has a plurality of pin connectors for translating bus signals between the motherboard and the expansion boards in order to alleviate congestion caused by the difference between the data processing capacity of a central processing unit and the data transmission capacity of the data bus due to the supporting of two different kinds of bus architectures.

16 Claims, 2 Drawing Sheets

DUAL-BUS RISER CARD FOR AN EXPANSION SLOT

CROSS-REFERENCE TO RELATED APPLICATION

This application makes reference to, incorporates the same herein, and claims all benefits accruing under 35 U.S.C. §119 from an application for *Dual-Bus Riser Card For An Expansion Slot* earlier filed in the Korean Industrial Property Office on Jul. 7, 1995, and there duly assigned Ser. No. 95-19941.

BACKGROUND OF THE INVENTION

1. Technical Field

The present invention relates to a dual-bus riser card for an expansion slot, and more particularly relates to an improved dual-bus riser card for an expansion slot in a computer system for operatively supporting expansion cards of at least two different types of bus architectures in which the expansion cards are mounted horizontally in a computer chassis to minimize the height requirement of the computer chassis.

2. Background Art

As personal computers advance to satisfy the need for increased memory capacity, faster program computation, higher display resolution and faster presentation of information to the computer user, the greater flexibility, adaptability and upgradibility of the personal computers to new and improved technologies are required to accept any of the readily available industry standard expansion boards with different types of bus architecture such as the Industry Standard Architecture (ISA) bus, the Extended Industry Standard Architecture (EISA) bus and PCI bus.

Traditionally, expansion boards are mounted vertically on corresponding connectors or expansion slots on a motherboard of the computer system for upgrading purposes. Since the expansion boards are mounted vertically from the motherboard of the computer system, the computer chassis becomes unnecessarily large. In order to minimize the size and height of the computer chassis, riser card is used as an expansion board assembly to accommodate a single or a plurality of expansion boards mounted horizontally on corresponding bus slots formed therein when its edge connector is mounted vertically on a motherboard expansion slot of the computer system.

Conventional riser card for an expansion slot in a computer system for supporting an expansion board such as disclosed in U.S. Pat. No. 5,174,762 for *Circuit Board Adapter For Computer System* issued to Hoppal et al., or for supporting a plurality of expansion boards such as disclosed in U.S. Pat. No. 5,406,453 for *Computer Chassis Planar/Riser Card Assembly* issued to Cusato et al., however, accommodates expansion board of only one type of bus architecture, that is, either an ISA bus or an EISA bus. Some other riser card configurations such as disclosed in U.S. Pat. No. 5,519,573 for *I/O Riser Card For Motherboard In A Personal Computer/Server* issued to Cobb et al., are mounted on a motherboard socket serving as an input/output device for connecting a video monitor, mouse, printer to the computer system. Since the conventional riser card for an expansion slot in the computer system such as those disclosed particularly in Hoppal et al. '762 and Cusato et al. '453 is fixed to a single type of bus architecture and is mounted only in one direction on a motherboard of the computer system, they are neither readily available for advanced computer system utilizing any combination of ISA, EISA or PCI bus or future bus expansions, nor are they useful and effective in simplifying the motherboard.

One recent improvement in the riser card configuration is disclosed in U.S. Pat. No. 5,513,329 for *Modular Host Local Expansion Upgrade* issued to Pecone. In Pecone '329 a riser card is adapted to accommodate expansion boards of different combinations of ISA, EISA or local bus architectures in corresponding bus slots formed therein. While the riser card configuration of Pecone '329 has merits in its own right, it is my observation that since all the expansion boards are mounted uniformly on one side of the riser card, the formation of the bus slots in the riser card for different ISA or EISA board during manufacture can be ineffective, time consuming and consequently costly. Moreover, the riser card configuration as disclosed by Pecone '329 does not effectively utilize the spatial arrangement of a motherboard of the computer system.

SUMMARY OF THE INVENTION

Accordingly, it is therefore an object of the present invention to provide a new and improved dual-bus riser card for an expansion slot formed on a motherboard of a computer system.

It is another object to provide a dual-bus riser card for an expansion slot of a motherboard in a computer system for efficiently supporting a plurality of expansion boards of any combination of bus architectures in which the expansion boards are mounted on the dual-bus riser card horizontally with respect to the motherboard in order to minimize the height requirement of a computer chassis.

It is yet another object to provide a dual-bus riser card for an expansion slot in a computer system having a first plurality of bus slots formed on one side of the riser card to accommodate corresponding expansion boards of one type of bus architecture such as an ISA bus or an EISA bus and a second plurality of bus slots formed on another side of the riser card to accommodate corresponding expansion boards of another type of bus architecture such as a PCI bus.

These and other objects can be achieved by a dual-bus riser card for an expansion slot in a computer system including a substrate having an edge connector removably mountable into the expansion slot substantially perpendicular to a motherboard of the computer system. A first plurality of bus slots are formed on one side of the substrate and adapted for connection to corresponding expansion boards of either ISA or EISA bus architecture substantially perpendicular to the substrate. A second plurality of bus slots are formed on another and opposite side of the substrate for connection to corresponding expansion boards of PCI bus architecture substantially perpendicular to the substrate. The edge connector of a dual-bus riser card in the substrate includes 2×120 pin connector, and a signal provided in each pin as shown in Table 1 as follows.

TABLE 1

| PIN | Signal Name | Signal Type |
|-----|-------------|-------------|
| A1  | IOCHCK#     | ISA         |
| A2  | −5V         | POWER       |
| A3  | SD7         | ISA         |
| A4  | SD6         | ISA         |
| A5  | SD5         | ISA         |
| A6  | SD4         | ISA         |
| A7  | SD3         | ISA         |

TABLE 1-continued

| PIN | Signal Name | Signal Type |
|---|---|---|
| A8 | SD2 | ISA |
| A9 | SD1 | ISA |
| A10 | SD0 | ISA |
| A11 | GND | POWER |
| A12 | IOCHRDY | ISA |
| A13 | AXN | ISA |
| A14 | SA19 | ISA |
| A15 | SA18 | ISA |
| A16 | SA17 | ISA |
| A17 | SA16 | ISA |
| A18 | SA15 | ISA |
| A19 | SA14 | ISA |
| A20 | SA13 | ISA |
| A21 | SA12 | ISA |
| A22 | GND | POWER |
| A23 | TRST# | PCI |
| A24 | +5V | POWER |
| A25 | TMS | PCI |
| A26 | TDI | PCI |
| A27 | +5V | POWER |
| A28 | INTA# | PCI |
| A29 | INTC# | PCI |
| A30 | +5V | POWER |
| A31 | PRSNTO | PCI |
| A32 | +5V | POWER |
| A33 | GNTO# | PCI |
| A34 | REQO# | PCI |
| A35 | +5V | POWER |
| A36 | RESET# | PCI |
| A37 | +5V | POWER |
| A38 | RESERVE | — |
| A39 | GNT1# | PCI |
| A40 | GND | POWER |
| A41 | GNT2# | PCI |
| A42 | RESERVE | — |
| A43 | +5V | POWER |
| A44 | IDSEL2 | PCI |
| A45 | GND | POWER |
| A46 | AD(30) | PCI |
| A47 | +5V | POWER |
| A48 | AD(28) | PCI |
| A49 | AD(26) | PCI |
| A50 | GND | POWER |
| A51 | AD(24) | PCI |
| A52 | IDSEL1 | PCI |
| A53 | +5V | POWER |
| A54 | AD(22) | PCI |
| A55 | AD(20) | PCI |
| A56 | GND | POWER |
| A57 | AD(18) | PCI |
| A58 | AD(16) | PCI |
| A59 | +5V | PCI |
| A60 | FRAME# | PCI |
| A61 | GND | POWER |
| A62 | TRDY# | PCI |
| A63 | GND | POWER |
| A64 | STOP# | PCI |
| A65 | +5V | POWER |
| A66 | SDONE | PCI |
| A67 | SBO# | PCI |
| A68 | GND | POWER |
| A69 | PAR | PCI |
| A70 | AD(15) | PCI |
| A71 | +5V | POWER |
| A72 | AD(13) | PCI |
| A73 | AD(11) | PCI |
| A74 | GND | POWER |
| A75 | AD(9) | PCI |
| A76 | C/BE(O)# | PCI |
| A77 | +5V | POWER |
| A78 | AD(6) | PCI |
| A79 | AD(4) | PCI |
| A80 | GND | POWER |
| A81 | AD(2) | PCI |
| A82 | AAD(4) | PCI |
| A83 | +5V | POWER |
| A84 | REQ64# | PCI |
| A85 | +5V | POWER |
| A86 | +5V | POWER |
| A87 | GND | POWER |
| A88 | SA11 | ISA |
| A89 | +5V | POWER |
| A90 | SA10 | ISA |
| A91 | SA9 | ISA |
| A92 | SA8 | ISA |
| A93 | SA7 | ISA |
| A94 | SA6 | ISA |
| A95 | SA5 | ISA |
| A96 | SA4 | ISA |
| A97 | SA3 | ISA |
| A98 | SA2 | ISA |
| A99 | SA1 | ISA |
| A100 | SA0 | ISA |
| A101 | GND | POWER |
| A102 | RFU | N/A |
| A103 | SBHE# | ISA |
| A104 | LA23 | ISA |
| A105 | LA22 | ISA |
| A106 | LA21 | ISA |
| A107 | LA20 | ISA |
| A108 | LA19 | ISA |
| A109 | LA18 | ISA |
| A110 | LA17 | ISA |
| A111 | MEMR# | ISA |
| A112 | MEMW# | ISA |
| A113 | SD8 | ISA |
| A114 | SD9 | ISA |
| A115 | SD10 | ISA |
| A116 | SD11 | ISA |
| A117 | SD12 | ISA |
| A118 | SD13 | ISA |
| A119 | SD14 | ISA |
| A120 | SD15 | ISA |
| B1 | GND | POWER |
| B2 | −12V | POWER |
| B3 | RESTDRV | ISA |
| B4 | −12V | POWER |
| B5 | IRQ9 | ISA |
| B6 | +12V | POWER |
| B7 | DRQ2 | ISA |
| B8 | +12V | POWER |
| B9 | OWS# | ISA |
| B10 | +12V | POWER |
| B11 | +5V | POWER |
| B12 | GND | POWER |
| B13 | SMEMW# | ISA |
| B14 | SMEMR# | ISA |
| B15 | IOW# | ISA |
| B16 | IOR# | ISA |
| B17 | DACK3# | ISA |
| B18 | DRQ3 | ISA |
| B19 | DACK1# | ISA |
| B20 | DRQ1 | ISA |
| B21 | REFRESH# | ISA |
| B22 | GND | POWER |
| B23 | +5V | POWER |
| B24 | TCK | PCI |
| B25 | GND | POWER |
| B26 | TDD | PCI |
| B27 | GND | POWER |
| B28 | +5V | POWER |
| B29 | INTB# | PCI |
| B30 | INTE# | PCI |
| B31 | PRSNT1# | PCI |
| B32 | GND | POWER |
| B33 | PRNST2# | PCI |
| B34 | GND | POWER |
| B35 | CLK_SLOT1 | PCI |
| B36 | GND | POWER |
| B37 | CLK_SLOT2 | PCI |
| B38 | GND | POWER |
| B39 | GND | POWER |
| B40 | REQ1# | PCI |
| B41 | REQ2# | PCI |

TABLE 1-continued

| PIN | Signal Name | Signal Type |
|---|---|---|
| B42 | +5V | POWER |
| B43 | GND | POWER |
| B44 | IDSEL0 | PCI |
| B45 | +5V | POWER |
| B46 | AD(31) | PCI |
| B47 | AD(29) | PCI |
| B48 | GND | POWER |
| B49 | AD(27) | PCI |
| B50 | AD(25) | PCI |
| B51 | +5V | POWER |
| B52 | C/BE(3)# | PCI |
| B53 | AD(23) | PCI |
| B54 | GND | POWER |
| B55 | AD(21) | PCI |
| B56 | AD(19) | PCI |
| B57 | +5V | POWER |
| B58 | AD(17) | PCI |
| B59 | C/BE(2)# | PCI |
| B60 | GND | POWER |
| B61 | IRDY# | PCI |
| B62 | +5V | POWER |
| B63 | DEVSEL# | PCI |
| B64 | GND | POWER |
| B65 | LOCK# | PCI |
| B66 | PERR# | PCI |
| B67 | +5V | POWER |
| B68 | SERR# | POWER |
| B69 | +5V | POWER |
| B70 | C/BE1# | PCI |
| B71 | AD(14) | PCI |
| B72 | GND | POWER |
| B73 | AD(12) | PCI |
| B74 | AD(10) | PCI |
| B75 | GND | POWER |
| B76 | AD(8) | PCI |
| B77 | AD(7) | PCI |
| B78 | +5V | POWER |
| B79 | AD(5) | PCI |
| B80 | AD(3) | PCI |
| B81 | GND | POWER |
| B82 | AD(1) | PCI |
| B83 | +5V | POWER |
| B84 | ACK64# | PCI |
| B85 | +5V | POWER |
| B86 | +5V | POWER |
| B87 | GND | POWER |
| B88 | GND | POWER |
| B89 | SYSCLK | PCI |
| B90 | GND | POWER |
| B91 | IRQ7 | ISA |
| B92 | IRQ6 | ISA |
| B93 | IRQ5 | ISA |
| B94 | IRQ4 | ISA |
| B95 | IRQ3 | ISA |
| B96 | DACK2# | ISA |
| B97 | TC | ISA |
| B98 | BALE | ISA |
| B99 | RFU | N/A |
| B100 | GND | POWER |
| B101 | OSC | ISA |
| B102 | +5V | POWER |
| B103 | MEMCS16# | ISA |
| B104 | IOCS16# | ISA |
| B105 | IRQ10 | ISA |
| B106 | IRQ11 | ISA |
| B107 | IRQ12 | ISA |
| B108 | IRQ15 | ISA |
| B109 | IRQ14 | ISA |
| B110 | DACK0# | ISA |
| B111 | DRQ0 | ISA |
| B112 | DACK5# | ISA |
| B113 | DRQ5 | ISA |
| B114 | DACK6# | ISA |
| B115 | DRQ6 | ISA |
| B116 | DACK7# | ISA |
| B117 | DRQ7 | ISA |
| B118 | +5V | POWER |
| B119 | MASTER# | ISA |
| B120 | GND | POWER |

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 is a plan view illustrating a motherboard of the computer system in which a dual-bus riser card for an expansion slot constructed according to the present invention is mounted on;

DETAILED DESCRIPTION OF THE PREFERRED EMBODIMENT

Figure 1:
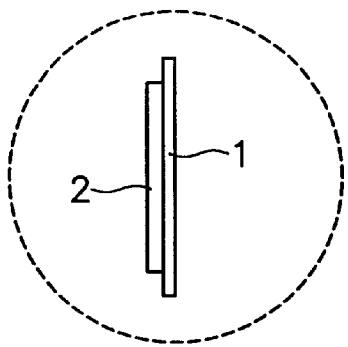
FIG. 1 is a side sectional view illustrating a typical riser card for an expansion slot in a computer system.

Referring now to the drawings and particularly to FIG. 1, which illustrates a side sectional view of a conventional riser card for an expansion slot on a motherboard of a computer system. The conventional riser card for an expansion slot includes a substrate 1 having an edge connector (not shown) which is mounted in an expansion slot substantially perpendicular to a motherboard (not shown) of the computer system. The conventional riser card typical has a bus slot 2 for supporting a single bus.

As described earlier, since the conventional riser card for an expansion slot in the computer system is fixed to a single type of bus architecture and is mounted only in one direction on a motherboard of the computer system, the riser card is not readily available for advanced computer system utilizing any combination of ISA, EISA or PCI bus or future bus expansions, nor is it useful and effective in utilizing the spatial arrangement of a motherboard of the computer system.

Figure 2:
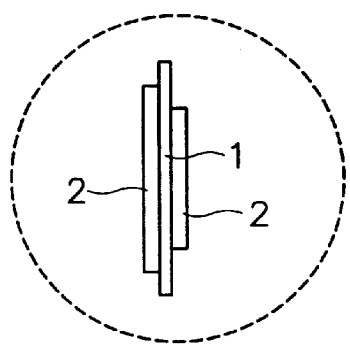
FIG. 2 is a side sectional view illustrating a dual-bus riser card for an expansion slot in a computer system constructed according to the principles of the present invention.

Turning now to FIG. 2 which is a side sectional view illustrating a dual-bus riser card for an expansion slot in a computer system constructed according to the principles of the present invention. The dual-bus riser card of FIG. 2 is formed by a substrate 1 having an edge connector (not shown) removably mountable into an expansion slot substantially perpendicular to a motherboard of the computer system, bus slots 2 formed on opposite sides of the substrate and adapted for connection to corresponding either ISA or EISA expansion boards on one side and PCI expansion boards on another side of the substrate.

Figure 3:
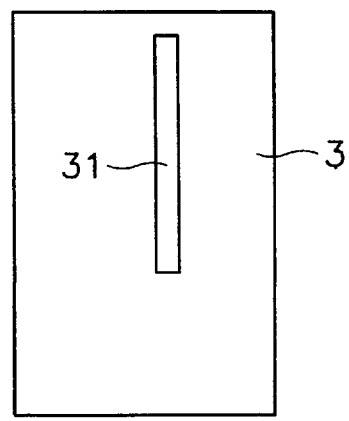

FIG. 3 is a plan view illustrating a motherboard 3 of a computer system having an expansion slot 31 contained therein for accommodating a removably insertion of a dual-bus riser card constructed according to the present invention.

Figure 4A:
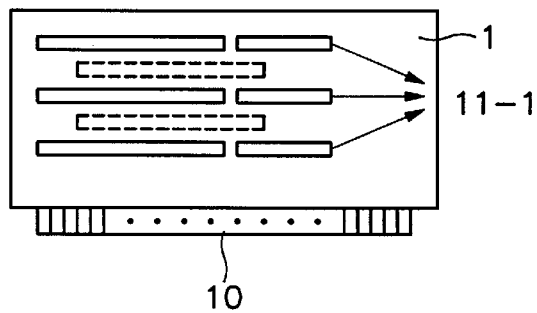
FIGS. 4A and 4B are block diagrams illustrating a structure of a dual-bus riser card for an expansion slot in a computer system for supporting 3 ISA bus slots and 2 PCI bus slots according to a first preferred embodiment of the present invention.
Figure 4B:
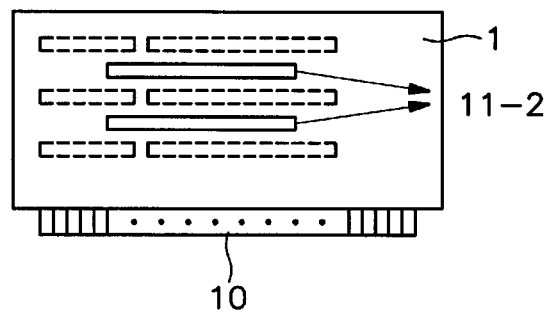
Figure 5A:
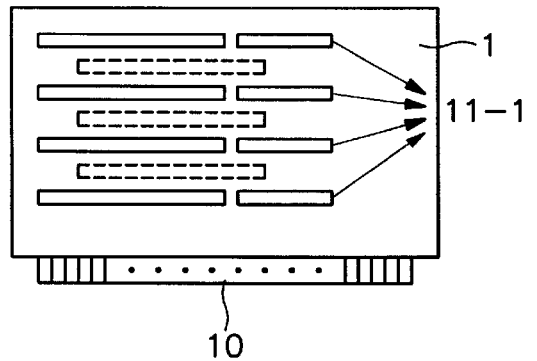
FIGS. 5A and 5B are block diagram illustrating a structure of a dual-bus riser card for an expansion slot in a computer system for supporting 4 ISA bus slots and 3 PCI bus slots according to a second preferred embodiment of the present invention.
Figure 5B:
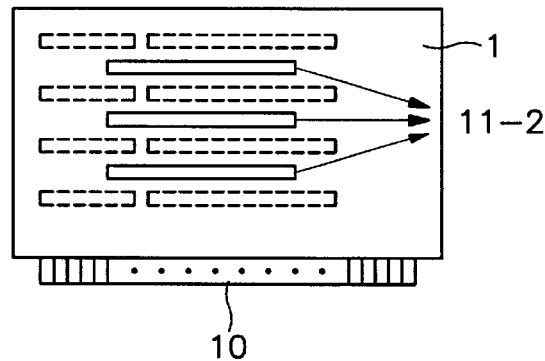

FIGS. 4A and 4B illustrate a structure of a dual-bus riser card for an expansion slot for supporting 3 ISA bus slots and 2 PCI bus slots according to a first preferred embodiment of the present invention, and FIGS. 5A and 5B illustrate a structure of a dual-bus riser card for an expansion slot for supporting 4 ISA bus slots accommodating corresponding ISA expansion boards and 3 PCI bus slots accommodating corresponding PCI expansion boards according to a second preferred embodiment of the present invention. Each dual-bus riser card configuration as shown in FIGS. 4A and 4B and FIGS. 5A and 5B has an edge connector 10 containing 2×120 pin connectors for connecting the ISA and PCI expansion boards to the motherboard. The signal provided in each pin of the edge connector 10 is shown in Table 1 as follows:

TABLE 1

| PIN | Signal Name | Signal Type |
|---|---|---|
| A1 | IOCHCK# | ISA |
| A2 | −5V | POWER |
| A3 | SD7 | ISA |
| A4 | SD6 | ISA |
| A5 | SD5 | ISA |
| A6 | SD4 | ISA |
| A7 | SD3 | ISA |
| A8 | SD2 | ISA |
| A9 | SD1 | ISA |
| A10 | SD0 | ISA |
| A11 | GND | POWER |
| A12 | IOCHRDY | ISA |
| A13 | AXN | ISA |
| A14 | SA19 | ISA |
| A15 | SA18 | ISA |
| A16 | SA17 | ISA |
| A17 | SA16 | ISA |
| A18 | SA15 | ISA |
| A19 | SA14 | ISA |
| A20 | SA13 | ISA |
| A21 | SA12 | ISA |
| A22 | GND | POWER |
| A23 | TRST# | PCI |
| A24 | +5V | POWER |
| A25 | TMS | PCI |
| A26 | TDI | PCI |
| A27 | +5V | POWER |
| A28 | INTA# | PCI |
| A29 | INTC# | PCI |
| A30 | +5V | POWER |
| A31 | PRSNT0 | PCI |
| A32 | +5V | POWER |
| A33 | GNT0# | PCI |
| A34 | REQ0# | PCI |
| A35 | +5V | POWER |
| A36 | RESET# | PCI |
| A37 | +5V | POWER |
| A38 | RESERVE | — |
| A39 | GNT1# | PCI |
| A40 | GND | POWER |
| A41 | GNT2# | PCI |
| A42 | RESERVE | — |
| A43 | +5V | POWER |
| A44 | IDSEL2 | PCI |

TABLE 1-continued

| PIN | Signal Name | Signal Type |
|---|---|---|
| A45 | GND | POWER |
| A46 | AD(30) | PCI |
| A47 | +5V | POWER |
| A48 | AD(28) | PCI |
| A49 | AD(26) | PCI |
| A50 | GND | POWER |
| A51 | AD(24) | PCI |
| A52 | IDSEL1 | PCI |
| A53 | +5V | POWER |
| A54 | AD(22) | PCI |
| A55 | AD(20) | PCI |
| A56 | GND | POWER |
| A57 | AD(18) | PCI |
| A58 | AD(16) | PCI |
| A59 | +5V | PCI |
| A60 | FRAME# | PCI |
| A61 | GND | POWER |
| A62 | TRDY# | PCI |
| A63 | GND | POWER |
| A64 | STOP# | PCI |
| A65 | +5V | POWER |
| A66 | SDONE | PCI |
| A67 | SBO# | PCI |
| A68 | GND | POWER |
| A69 | PAR | PCI |
| A70 | AD(15) | PCI |
| A71 | +5V | POWER |
| A72 | AD(13) | PCI |
| A73 | AD(11) | PCI |
| A74 | GND | POWER |
| A75 | AD(9) | PCI |
| A76 | C/BE(O)# | PCI |
| A77 | +5V | POWER |
| A78 | AD(6) | PCI |
| A79 | AD(4) | PCI |
| A80 | GND | POWER |
| A81 | AD(2) | PCI |
| A82 | AAD(4) | PCI |
| A83 | +5V | POWER |
| A84 | REQ64# | PCI |
| A85 | +5V | POWER |
| A86 | +5V | POWER |
| A87 | GND | POWER |
| A88 | SA11 | ISA |
| A89 | +5V | POWER |
| A90 | SA10 | ISA |
| A91 | SA9 | ISA |
| A92 | SA8 | ISA |
| A93 | SA7 | ISA |
| A94 | SA6 | ISA |
| A95 | SA5 | ISA |
| A96 | SA4 | ISA |
| A97 | SA3 | ISA |
| A98 | SA2 | ISA |
| A99 | SA1 | ISA |
| A100 | SA0 | ISA |
| A101 | GND | POWER |
| A102 | RFU | N/A |
| A103 | SBHE# | ISA |
| A104 | LA23 | ISA |
| A105 | LA22 | ISA |
| A106 | LA21 | ISA |
| A107 | LA20 | ISA |
| A108 | LA19 | ISA |
| A109 | LA18 | ISA |
| A110 | LA17 | ISA |
| A111 | MEMR# | ISA |
| A112 | MEMW# | ISA |
| A113 | SD8 | ISA |
| A114 | SD9 | ISA |
| A115 | SD10 | ISA |
| A116 | SD11 | ISA |
| A117 | SD12 | ISA |
| A118 | SD13 | ISA |
| A119 | SD14 | ISA |
| A120 | SD15 | ISA |
| B1 | GND | POWER |

TABLE 1-continued

| PIN | Signal Name | Signal Type |
|-----|-------------|-------------|
| B2 | −12V | POWER |
| B3 | RESTDRV | ISA |
| B4 | −12V | POWER |
| B5 | IRQ9 | ISA |
| B6 | +12V | POWER |
| B7 | DRQ2 | ISA |
| B8 | +12V | POWER |
| B9 | OWS# | ISA |
| B10 | +12V | POWER |
| B11 | +5V | POWER |
| B12 | GND | POWER |
| B13 | SMEMW# | ISA |
| B14 | SMEMR# | ISA |
| B15 | IOW# | ISA |
| B16 | IOR# | ISA |
| B17 | DACK3# | ISA |
| B18 | DRQ3 | ISA |
| B19 | DACK1# | ISA |
| B20 | DRQ1 | ISA |
| B21 | REFRESH# | ISA |
| B22 | GND | POWER |
| B23 | +5V | POWER |
| B24 | TCK | PCI |
| B25 | GND | POWER |
| B26 | TDD | PCI |
| B27 | GND | POWER |
| B28 | +5V | POWER |
| B29 | INTB# | PCI |
| B30 | INTE# | PCI |
| B31 | PRSNT1# | PCI |
| B32 | GND | POWER |
| B33 | PRNST2# | PCI |
| B34 | GND | POWER |
| B35 | CLK_SLOT1 | PCI |
| B36 | GND | POWER |
| B37 | CLK_SLOT2 | PCI |
| B38 | GND | POWER |
| B39 | GND | POWER |
| B40 | REQ1# | PCI |
| B41 | REQ2# | PCI |
| B42 | +5V | POWER |
| B43 | GND | POWER |
| B44 | IDSEL0 | PCI |
| B45 | +5V | POWER |
| B46 | AD(31) | PCI |
| B47 | AD(29) | PCI |
| B48 | GND | POWER |
| B49 | AD(27) | PCI |
| B50 | AD(25) | PCI |
| B51 | +5V | POWER |
| B52 | C/BE(3)# | PCI |
| B53 | AD(23) | PCI |
| B54 | GND | POWER |
| B55 | AD(21) | PCI |
| B56 | AD(19) | PCI |
| B57 | +5V | POWER |
| B58 | AD(17) | PCI |
| B59 | C/BE(2)# | PCI |
| B60 | GND | POWER |
| B61 | IRDY# | PCI |
| B62 | +5V | POWER |
| B63 | DEVSEL# | PCI |
| B64 | GND | POWER |
| B65 | LOCK# | PCI |
| B66 | PERR# | PCI |
| B67 | +5V | POWER |
| B68 | SERR# | POWER |
| B69 | +5V | POWER |
| B70 | C/BE1# | PCI |
| B71 | AD(14) | PCI |
| B72 | GND | POWER |
| B73 | AD(12) | PCI |
| B74 | AD(10) | PCI |
| B75 | GND | POWER |
| B76 | AD(8) | PCI |
| B77 | AD(7) | PCI |
| B78 | +5V | POWER |

TABLE 1-continued

| PIN | Signal Name | Signal Type |
|-----|-------------|-------------|
| B79 | AD(5) | PCI |
| B80 | AD(3) | PCI |
| B81 | GND | POWER |
| B82 | AD(1) | PCI |
| B83 | +5V | POWER |
| B84 | ACK64# | PCI |
| B85 | +5V | POWER |
| B86 | +5V | POWER |
| B87 | GND | POWER |
| B88 | GND | POWER |
| B89 | SYSCLK | PCI |
| B90 | GND | POWER |
| B91 | IRQ7 | ISA |
| B92 | IRQ6 | ISA |
| B93 | IRQ5 | ISA |
| B94 | IRQ4 | ISA |
| B95 | IRQ3 | ISA |
| B96 | DACK2# | ISA |
| B97 | TC | ISA |
| B98 | BALE | ISA |
| B99 | RFU | N/A |
| B100 | GND | POWER |
| B101 | OSC | ISA |
| B102 | +5V | POWER |
| B103 | MEMCS16# | ISA |
| B104 | IOCS16# | ISA |
| B105 | IRQ10 | ISA |
| B106 | IRQ11 | ISA |
| B107 | IRQ12 | ISA |
| B108 | IRQ15 | ISA |
| B109 | IRQ14 | ISA |
| B110 | DACK0# | ISA |
| B111 | DRQ0 | ISA |
| B112 | DACK5# | ISA |
| B113 | DRQ5 | ISA |
| B114 | DACK6# | ISA |
| B115 | DRQ6 | ISA |
| B116 | DACK7# | ISA |
| B117 | DRQ7 | ISA |
| B118 | +5V | POWER |
| B119 | MASTER# | ISA |
| B120 | GND | POWER |

The operation of the dual-bus riser card for an expansion slot constructed according to the principles of the present invention including a substrate 1 having an edge connector 10 insertable into an expansion slot 31 in a motherboard 3, and bus slots 11-1 and 11-2 for supporting various kinds of buses will be described with reference to FIGS. 3 to 5 as follows.

When the riser card edge connector 10 in the substrate 1 is connected to the expansion slot 31 in the motherboard 3, an expansion card can be horizontally mounted as the conventional riser card for an expansion slot in order to minimize the height of a computer chassis. As contemplated by the present invention, the dual-bus riser card for an expansion slot, which is mounted in the motherboard, is intended to support a PCI bus and an ISA bus, or the PCI bus and an EISA bus at the same time.

For example, referring to FIG. 4A, two kinds of buses can be supported at the same time by positioning the ISA bus slot 11-1 on one side of the dual-bus riser card for an expansion slot and the PCI bus slot 11-2 on the opposite side of the dual-bus riser card for an expansion slot. It is also possible for the dual-bus riser card constructed according the present invention to accommodate any combination of two different buses. The most typical bus types are, however, the riser card for an expansion slot for supporting 3 ISA bus slots and 2 PCI bus slots as shown in FIG. 4A and 4B, and the riser card for an expansion slot for supporting 4 slots of ISA bus type and 3 slots of PCI bus type as shown in FIGS. 5A and 5B.

When the dual-bus riser card is constructed according to the principles of the present invention, the data processing speed of a computer system can be advantageously improved by alleviating the congestion caused by the difference between the data processing capacity of a central processing unit and the data transmission capacity of the bus during a data transmission process due to supporting two different kinds of buses.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system, comprising:

a motherboard installed in said computer system and having at least an expansion slot connected to address, data, control, power and ground buses of the motherboard;

a dual-bus riser card formed of a substrate having an edge connector removably mountable into said expansion slot extending in a direction substantially perpendicular to said motherboard so as to access to the address, data, control, power and ground buses of the motherboard; and said dual-bus riser card having a first plurality of bus slots formed on one side of said substrate and adapted for connection to corresponding expansion boards of a first type of bus architecture for communication between the motherboard and the expansion boards of said first type via a common bus of said first type of bus architecture, and a second plurality of bus slots formed on another and opposite side of said substrate and adapted for connection to corresponding expansion boards of a second type of bus architecture different from said first type for communication between the motherboard and the expansion boards of said second type via another common bus of said second type of bus architecture, said first plurality of bus slots and said second plurality of bus slot being sequentially arranged in successions along opposite sides of said substrate to maximize the spatial arrangement of said motherboard installed in said computer system and simplify electrically connection to said edge connector of said dual-bus riser card for translating bus signals between the motherboard and the expansion boards.

2. The computer system of claim 1, further comprised of said first plurality of bus slots formed on said dual-bus riser card accommodating Industrial Standard Architecture (ISA) expansion boards, and said second plurality of bus slots formed on said dual-bus riser card accommodating Peripheral Connect Interface expansion boards.

3. The computer system of claim 1, further comprised of said first plurality of bus slots formed on said dual-bus riser card accommodating Enhanced Industrial Standard Architecture expansion boards, and said second plurality of bus slots formed on said dual-bus riser card accommodating Peripheral Connect Interface expansion boards.

4. The computer system of claim 1, further comprised of said dual-bus riser card comprising three Industrial Standard Architecture bus slots formed on one side of said substrate and two Peripheral Connect Interface bus slots formed on said opposite side of said substrate.

5. The computer system of claim 1, further comprised of said dual-bus riser card comprising four Industrial Standard Architecture bus slots formed on one side of said substrate and three Peripheral Connect Interface bus slots formed on said opposite side of said substrate.

6. The computer system of claim 2, further comprised of said edge connector of said dual-bus riser card containing 2×120 pin connectors for connecting said Industrial Standard Architecture expansion boards and said Peripheral Connect Interface expansion boards to said motherboard.

7. A dual-bus riser card for an expansion slot in a computer system, comprising:

a substrate having an edge portion removably mountable into said expansion slot substantially perpendicular to a motherboard of said computer system;

a first plurality of bus slots formed on one side of said substrate and adapted for connection to corresponding expansion boards of a first type of bus architecture substantially perpendicular to said substrate for communication between the motherboard and the expansion boards of said first type via a common bus of said first type of bus architecture;

a second plurality of bus slots formed on another and opposite side of said substrate for connection to corresponding expansion boards of a second type of bus architecture different from said first type substantially perpendicular to said substrate for communication between the motherboard and the expansion boards of said second type via another common bus of said second type of bus architecture; and said edge portion having a plurality of pin connectors for translating bus signals between the motherboard and the expansion boards via the common bus of said first type and said second type of bus architecture.

8. The dual-bus riser card of claim 7, further comprised of said first plurality of bus slots formed on said dual-bus riser card accommodating Industrial Standard Architecture expansion boards, and said second plurality of bus slots formed on said dual-bus riser card accommodating Peripheral Connect Interface expansion boards.

9. The dual-bus riser card of claim 7, further comprised of said first plurality of bus slots formed on said dual-bus riser card accommodating Enhanced Industrial Standard Architecture expansion boards, and said second plurality of bus slots formed on said dual-bus riser card accommodating Peripheral Connect Interface expansion boards.

10. The dual-bus riser card of claim 7, further comprised of said first plurality of bus slots corresponding to three Industrial Standard Architecture bus slots formed on one side of said substrate and said second plurality of bus slots corresponding to two Peripheral Connect Interface bus slots formed on said opposite side of said substrate.

11. The dual-bus riser card of claim 7, further comprised of said first plurality of bus slots corresponding to four Industrial Standard Architecture bus slots formed on one side of said substrate and said second plurality of bus slots corresponding to three Peripheral Connect Interface bus slots formed on said opposite side of said substrate.

12. A dual-bus riser card for an expansion slot in a computer system, comprising:

a substrate having an edge connector mountable into said expansion slot of a motherboard installed in said computer system to extend in a direction substantially perpendicular to said motherboard;

a first plurality of bus slots communicatively connected to said edge connector, successively arranged on one side of said substrate extending in a direction substantially perpendicular to said substrate, and adapted for connection to corresponding expansion boards of a first type of bus architecture;

a second plurality of bus slots communicatively connected to said edge connector, successively arranged on an opposite side of said substrate in alternation with said first plurality of bus slots successively arranged on said one side of said substrate extending substantially perpendicular to said substrate, and adapted for connection to corresponding expansion boards of a second type of bus architecture different from said first type; and said edge connector having a plurality of pin connectors communicatively connected to said first plurality of bus slots successively formed on one side of said substrate and said second plurality of bus slots successively arranged on said opposite side of said substrate, for translating bus signals between the motherboard and the expansion boards through selected ones of said first plurality of bus slots and said second plurality of bus slots.

13. The dual-bus riser card of claim 12, further comprised of said first plurality of bus slots successively arranged on one side of said substrate accommodating Industrial Standard Architecture expansion boards, and said second plurality of bus slots successively arranged on said opposite side of said substrate accommodating Peripheral Connect Interface expansion boards.

14. The dual-bus riser card of claim 12, further comprised of said first plurality of bus slots successively arranged on one side of said substrate accommodating Enhanced Industrial Standard Architecture expansion boards, and said second plurality of bus slots successively arranged on said opposite side of said substrate Peripheral Connect Interface expansion boards.

15. The dual-bus riser card of claim 12, further comprised of said first plurality of bus slots corresponding to three Industrial Standard Architecture bus slots sequentially arranged on one side of said substrate and said second plurality of bus slots corresponding to two Peripheral Connect Interface bus slots sequentially arranged on said opposite side of said substrate.

16. The dual-bus riser card of claim 12, further comprised of said first plurality of bus slots corresponding to four Industrial Standard Architecture bus slots sequentially arranged on one side of said substrate and said second plurality of bus slots corresponding to three Peripheral Connect Interface bus slots sequentially arranged on opposite side of said substrate.

* * * * *